J. H. THEISS.
SUPPORTING DEVICE.
APPLICATION FILED JUNE 1, 1915.

1,211,895.

Patented Jan. 9, 1917.
2 SHEETS—SHEET 1.

Witnesses:
N. Fisher
William A. Hardy

Inventor:
John H. Theiss

J. H. THEISS.
SUPPORTING DEVICE.
APPLICATION FILED JUNE 1, 1915.

1,211,895.

Patented Jan. 9, 1917.
2 SHEETS—SHEET 2.

Witnesses:
N. B. Fisher
William A. Hardy.

Inventor:
John H. Theiss

UNITED STATES PATENT OFFICE.

JOHN H. THEISS, OF MOUNT VERNON, NEW YORK.

SUPPORTING DEVICE.

1,211,895.      Specification of Letters Patent.      Patented Jan. 9, 1917.

Application filed June 1, 1915. Serial No. 31,363.

*To all whom it may concern:*

Be it known that I, JOHN H. THEISS, a citizen of the United States, and a resident of Mount Vernon, in the county of Westchester and State of New York, have invented certain new and useful Improvements in Supporting Devices, of which the following is a description.

My invention relates to supporting devices and more particularly to camera supporting devices, such as tripods, which are especially designed for use in taking panoramic motion pictures.

The principal object of my invention is to provide an improved supporting device of this character which is capable of such adjustment or adjustments as to effect the movement of a camera carried thereby, preferably in any desired direction, necessary for the taking of panoramic motion picture negatives by the use of such camera, and which is so designed that, regardless of wear therein and the length of time the same has been used, all unevenness and unsteadiness of such movement is obviated, and in consequence there will be no "swaying" in moving pictures projected by the use of positives produced from such negatives.

My invention also contemplates an improved construction whereby the above described movement may be readily and easily effected and no binding or sticking of any of the parts of the supporting device will occur during such movement.

Another object of my invention is to provide a rigid, simple and compact device of this character which may be readily taken apart and assembled and wherein provision is made for the protection of certain of the parts.

Other objects and features of my invention reside in the details of construction and combinations of elements hereinafter more fully described and claimed.

Figure 1:
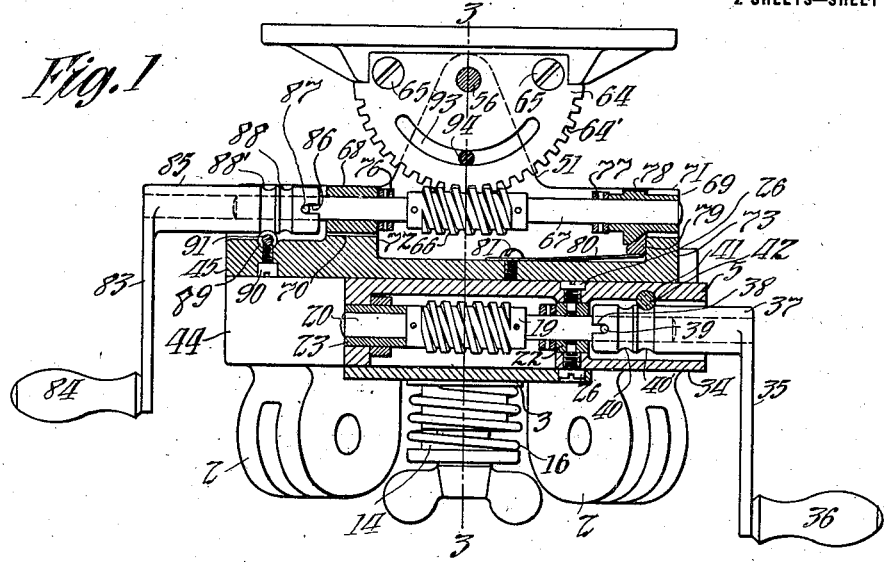
Figure 2:
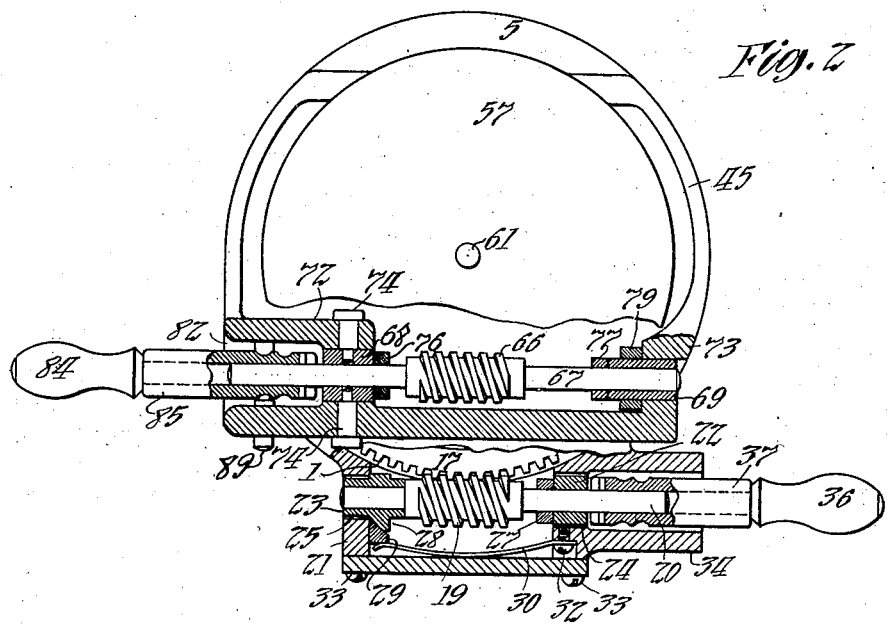
Figure 3:
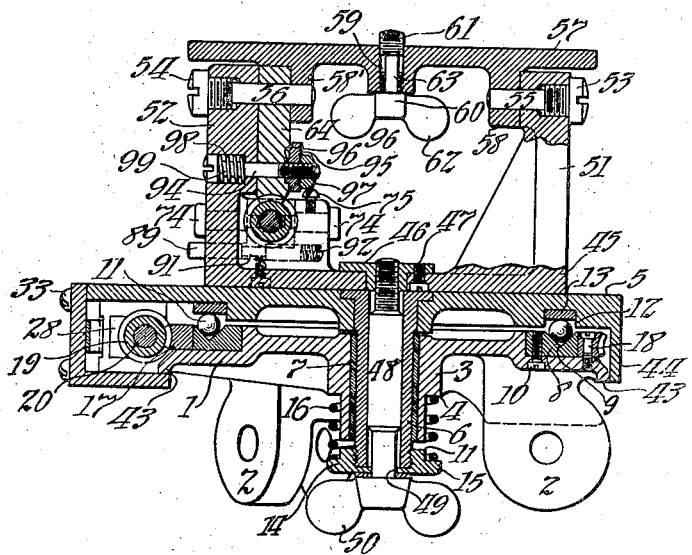

In order that my invention may be more clearly understood, attention is directed to the accompanyng drawings forming a part of this specification and in which:

Figure 1 is a side elevational view, partly in section, of a camera supporting device in accordance with my invention; Fig. 2 is a plan view thereof, partly in section; and Fig. 3 is a sectional view, partly in elevation, taken on line 3—3 of Fig. 1.

The same reference characters are used to designate corresponding parts in the several views of the drawings.

Referring to the drawings, reference character 1 represents a horizontal table or frame, such as the head of a tripod, which is preferably substantially circular and is provided with three equi-spaced pairs of depending lugs 2, preferably formed integrally therewith, for securing the frame to the tripod legs (not shown). The frame 1 is provided with a central hollow hub or bearing portion 3 having a reduced lower end portion whereby a shoulder 4 is formed thereon. A platform or support 5, also substantially circular in shape, is disposed above the frame 1 and is supported by the latter for pivotal movement about a vertical axis with respect thereto.

Secured in any suitable manner in an opening formed in the center of the support 5 is a hollow bearing member 6 which extends through and projects below the hub or bearing portion 3. The interior of the hub or bearing portion 3 is provided with a bushing or bearing sleeve 7 for the member 6. A flat ring 8, provided with a V-shaped groove 9 forming a ball race, is suitably secured, as by means of screws 10, in an annular recess on the upper surface of the frame 1. Anti-friction balls 11 are disposed in the ball race 9 and the lower surface of the support 5 has an annular groove 12 in which is suitably secured a flat bearing ring or annular bearing strip 13, adapted to engage the balls 11. A cap 14 having an outwardly extending flange 15 is threaded on the lower end of the bearing member 6 and a coiled spring 16 is maintained under compression between the shoulder 4 of the hub 3 and the flange 15, whereby the support 5 will be yieldingly held in position with the bearing ring 13 in engagement with the anti-friction balls 11. The pressure with which the bearing ring engages the anti-friction balls may be readily varied by adjusting the cap 14. This construction permits easy turning movement of the support 5 on the frame 1 and provides a yielding connection therebetween, whereby during such turning movement any irregularities or the like in the connections between or the engaging parts of these members will be taken care of and binding or sticking in any of the parts will be prevented.

For turning the support 5 on the frame 1, I provide means preferably comprising a worm gear and a worm engaging the same. The worm gear is preferably in the form of an annular member 17 which surrounds the ring 8 and is suitably secured, as by means of screws 18, to the frame 1; while the worm 19 is formed on a sleeve secured to a horizontal shaft 20 which is rotatably mounted in a laterally extending substantially rectangular chamber 21 with which the support 5 is provided. The shaft 20 is journaled in a pair of bearings 22 and 23 which are rectangular in cross section and are respectively located adjacent and beyond the ends of the worm 19 in rectangular openings 24 and 25 formed in the end walls of the chamber 21. The bearing 22 is pivotally mounted for movement about a vertical axis in the opening 24 by means of two vertical screws 26 threaded into the upper and lower walls of the chamber 21 and provided with reduced cylindrical end portions respectively engaging a pair of opposed cylindrical openings in the bearing. The openings 24 and 25 are slightly wider than the bearings 22 and 23 to permit pivotal movement of the shaft 20 and worm 19 about the axis of screws 26 toward and from the worm gear 17. A collar 27 is secured to the shaft 20 within the chamber 21 and adjacent the bearing 22 to take up the end thrust of the worm 19 and shaft 20 to the right, referring to Figs. 1 and 2. The bearing 23 is slidable on shaft 20 and extends within the chamber 21 and into engagement with one end of the worm 19. The inwardly extending portion of bearing 23 is provided with a rectangular enlargement 28. A U-shaped member 29 with its legs horizontally disposed, is slidably mounted in the chamber 21 for horizontal movement and embraces the enlarged portion 28 of the bearing 23. The member 29 engages the adjacent end wall of chamber 21 and is guided in its movement by such wall and the upper and lower walls of this chamber. The base of the U-shaped member 29 is provided with an inclined or cam surface which engages a corresponding surface formed on the outer end of the enlargement 28. A leaf spring 30, secured at one end, as by means of the screw 32, to one wall of the chamber 21, bears against the outer wall of the latter at its central portion and engages the U-shaped member 29 at its other end. The spring 30 constantly tends to force the member 29 inwardly and consequently to maintain the bearing 23 firmly in engagement with the adjacent end of worm 19 and to move shaft 20 and worm 19 about the pivotal axis of the bearing 22 toward the worm gear 17. Accordingly, the worm and worm gear will be yieldingly maintained in proper engagement regardless of the wear which occurs therein and of any irregularities thereof due to imperfect manufacture or other reasons. The end thrust of the worm and its shaft 20 to the left, referring to Figs. 1 and 2, is taken up by the bearing 23 and member 29 and communicated thereby to the adjacent end wall of the chamber 21. The outer and lower walls of the chamber 21 are preferably integrally formed, and are removably secured in any suitable manner, as by screws 33, to the other walls thereof, whereby the parts of the device within chamber 1 are protected and yet rendered readily accessible.

One end of the shaft 20 extends beyond bearing 22 into a cylindrical recess or cavity formed in a projecting portion 34 of the chamber 21.

Reference character 35 represents a crank having at one end a handle 36 and at its other end a sleeve 37 adapted to be slipped on the end portion of shaft 20 in the recessed portion 34. Sleeve 37 is notched at its inner end, as shown at 38, to receive a pin 39 secured to the shaft 20 and thereby lock the crank to the shaft. The exterior of the sleeve 37 is provided with a pair of circumferential grooves 40 and 40' adapted to cooperate with a spring-pressed cylindrical rod or pin 41 having a reduced portion 42. The rod or pin 41 is slidably mounted in the support 5 so as to project intermediate its ends within the cylindrical recess of the projecting portion 34. In the normal position of pin 41, the main portion thereof projects into the cylindrical recess in the projection 34 and is adapted to engage either of the grooves 40 and 40' to hold the crank 35 against movement longitudinally of the shaft 20, while at the same time permitting rotation of the crank. When, however, the pin 41 is moved longitudinally to bring the reduced portion 42 thereof within the cavity or recess of the projecting portion 34, the crank 35 may be slid freely on the shaft 20 and removed from the same or applied thereto. The arrangement of the grooves 40 and 40' and pin 41 is such that when groove 40' is opposite pin 41, the pin 39 engages the notch 38 and the crank 35 is accordingly secured to shaft 20, while when groove 40 is opposite pin 41, the pin 39 is clear of notch 38 and crank 35 may be turned freely on the shaft 20.

The frame 1 is provided at its edge with a circumferential downwardly extending flange 43 and the support 5 is provided with a flange 44 which engages the flange 43 and forms a tight joint therewith. The lower wall of the chamber 21 also closely engages the flange 43, and consequently a substantially closed chamber is formed by the frame 1 and support 5, whereby the parts contained therein will be protected from injury and especially against dirt and dust.

Reference character 45 represents a frame, the base of which is provided with a central opening, in which opening a flanged nut 46 is secured as by means of a screw 47. Frame 45 is rigidly secured to the support 5 as by means of a rod 48 extending through and closely fitting the tubular bearing portion 6 of the support 5 and having an upper reduced threaded end portion engaging the nut 46 and a lower reduced portion extending through an opening therefor in the end wall 49 of the cap 14. Rod 48 is provided at its lower end with a butterfly 50, whereby the rod may be turned to rigidly secure the frame 45 to the support 5 or to release the same therefrom. The wall 49 of the cap 14 coöperates with the butterfly 50 to form a stop for the rod 48, while permitting rotation thereof to securely fasten the frame 45 to the support 5.

The frame 45 is provided with a pair of oppositely disposed standards 51 and 52 in the upper end portions of which a pair of horizontal screws 53 and 54 are respectively mounted. Screws 53 and 54 are respectively provided with reduced cylindrical inner end portions 55 and 56 which extend through and beyond the standards 51 and 52. A flat circular camera support 57 is mounted on the frame 45 for pivotal movement about a horizontal axis by means of a pair of depending lugs or projections 58 and 58' formed integrally with the support and respectively provided with openings engaged by the reduced end portions 55 and 56 of the screws 53 and 54. The camera support 57 is provided with a central vertical opening 59, the wall of the lower portion of which is screw threaded. Disposed in this opening is a member 60 for securing the camera to the support 57. The member 60 is provided at its upper end with an enlarged screw threaded portion 61 which is adapted to be threaded into an opening provided therefor in the base of the camera, as is customary. The threaded portion 61 is connected to a butterfly 62 at the lower end of member 60 by means of a reduced cylindrical shank 63. The butterfly 62 coöperates with that portion of the support 57 about the lower end of opening 59 to limit the upward movement of member 60 so that by turning the latter, the camera may be rigidly secured to the support 57. The threads formed on the lower portion of the wall of the opening 59 will prevent member 60, when the latter is disconnected from the camera, from falling out of the opening.

Pivotal movement of the camera support 57 about the axis of the horizontal screws 53 and 54 is effected in a manner similar to the movement of the horizontal support 5 about its vertical axis, namely, by means of gearing preferably comprising a worm gear and a worm engaging the same. The worm gear consists of a vertical segmental member 64 provided on its periphery with teeth 64', and is suitably secured, as by means of screws 65, to the projection or lug 58' of the support 57; while the worm 66 is formed on a sleeve suitably secured to a horizontal shaft 67 rotatably mounted on the frame 45. When the device is assembled, the segmental worm gear 64 is located between the projection 58' and standard 52 in engagement with the latter, and the smooth reduced end portion 56 of screw 54 extends through the worm gear, as shown in Fig. 3. The shaft 67 is journaled in a pair of bearings 68 and 69 which are rectangular in cross section and are respectively located beyond the ends of the worm 66 in rectangular recesses 70 and 71, said recesses being respectively formed in upwardly projecting portions 72 and 73 of the frame 45. The bearing 68 is mounted for movement about a horizontal axis in the recess 70 by means of two alined horizontal pins 74 suitably secured in the frame 45, as by means of set screws 75, and having reduced cylindrical end portions respectively engaging a pair of opposed cylindrical openings in the bearing. The bearings 68 and 69 fit closely between the side walls of the recesses 70 and 71, but the bottom wall of recess 70 is slightly below the bearing 68, when the latter is horizontal, and the bearing 69 is vertically movable in the recess 71, and consequently the shaft 67 and worm 66 are capable of movement about the axis of pins 74 toward and from the segmental worm gear 64. A collar 76 is secured to shaft 67 and coacts with the bearing 68 to take up the end thrust of the worm 66 and shaft 67 to the left, referring to Figs. 1 and 2. The bearing 69 is slidable on the shaft 67, but its movement to the left, referring to Fig. 1, is limited by a collar 77, secured to shaft 67, and with which it is designed to be held constantly in engagement. Bearing 69 is provided with a rectangular enlargement 78 which is embraced by a vertical U-shaped member 79 slidably mounted on the frame 45 for vertical movement. Member 79 is guided in its movement by the inner surface of the projection 73 and the bearing 69. The base of the U-shaped member 79 is provided with an inclined or cam surface which engages a similar surface formed on the lower end of the enlargement 78. A leaf spring 80 is secured at one end, as by means of a screw 81, to the base of the frame 45, and engages the lower end of the U-shaped member 79 and constantly tends to force the latter upwardly. Consequently, the spring 80 tends to constantly maintain the bearing 69 yieldingly but firmly in engagement with the collar 77 and to move the shaft 67 and worm 66 about the pivotal axis of the bearing 68 toward the worm gear 64. The worm 66 and worm gear 64 will accordingly be yieldingly maintained in proper engagement regardless of the wear which takes place therein and of any irregularities due to improper manufacture or other reasons. The end thrust of the worm 66 and shaft 67 to the right, referring to Figs. 1 and 2, is taken up by the collar 77, the bearing 69, and the U-shaped member 79 and communicated thereby to the projection 73 on the frame 45. The shaft 67 extends outwardly beyond the bearing 68 into a recess or cavity 82 formed in the projection 72 of the frame 45.

Reference character 83 represents a crank similar to the crank 35 and having at one end a handle 84 and at its other end a sleeve 85 adapted to be slipped on the end portion of shaft 67 in the recess 82. The sleeve 85 is notched at its inner end, as shown at 86, to receive a pin 87 secured to the shaft 67. The exterior of sleeve 85 is provided with a pair of circumferential grooves 88 and 88' adapted to coöperate with a spring-pressed cylindrical rod or pin 89 slidably mounted in the frame 45 and projecting into the recess 82. A screw 90 threaded into the frame 45 has a projecting end portion disposed between the shoulders formed by a reduced portion 91 of pin 89 and coacts with these shoulders to limit the movement of the pin in either direction. When the pin 89 is held in its outermost position by the spring 92, as shown in Fig. 3, the main or larger portion thereof will project into the recess 82 and will be adapted to engage either of the grooves 88 and 88' so as to prevent longitudinal movement of the crank 83 with respect to the shaft 67. When the pin 89 is moved longitudinally against the action of spring 92 to its innermost position, the reduced portion 91 thereof will be brought directly below the shaft 67, and thereupon the crank 83 may be slid freely on the shaft and removed therefrom or applied thereto. The arrangement is such that when groove 88' is opposite pin 89, the pin 87 engages the notch 86 and the crank 83 is accordingly secured to the shaft 67; while when groove 88 is opposite pin 89, pin 87 is clear of the notch 86 and the crank 83 may be turned freely on shaft 67.

The segmental worm gear 64 is provided with a curved slot 93 concentric with its periphery. A rod 94 provided with a head at its outer end and screw threaded at its inner end extends through the slot 93 and an opening therefor in the standard 52. Mounted on the inner end portion of rod 94 is a member 95 having a projection 96 which engages an enlargement of the slot 93 formed in the inner face of the segmental gear 64. A nut 97 threaded on the inner end of rod 94 serves to hold the member 95 in proper position on the rod. The opening for the rod 94 in the standard 52 is provided with an outer enlargement 98. A coiled spring 99 surrounds the rod 94 and bears against the head thereof and the bottom wall of the enlargement 98 and yieldingly and firmly holds the segmental gear 64, which is secured to the camera support 57, in close engagement with the inner surface of the standard 52. Consequently, all lateral play of the support 57 on the reduced portions 55 and 56 of screws 53 and 54 is prevented.

The operation of the device is believed to be readily understandable from the above detailed description. The turning of the crank 35, when operatively connected to shaft 20 as shown in Figs. 1 and 2, will effect the rotation of worm 19, and by reason of the engagement of the latter with the stationary worm gear 17 will cause bodily movement of the worm, together with the support 5, frame 45 and the camera support 57, about a vertical axis. The turning of crank 83 will effect the rotation of worm 66, and by reason of the engagement of the latter with the segmental worm gear 64, will cause bodily pivotal movement of the latter and the camera support 57 about the horizontal axis of the screws 53 and 54. Accordingly, a camera mounted on my improved support may be moved continuously and evenly either horizontally or vertically or in any desired direction by the proper operation of the cranks 35 and 83.

While I have specifically described a preferred embodiment of my invention, it is to be understood that such embodiment is subject to many changes in the size, form and arrangement of parts without departing from the spirit of the invention and the scope of the appended claims.

Having now described my invention, what I claim as new and desire to secure by Letters Patent is as follows:

1. In a device of the class described, a camera support mounted for movement about a given axis, mechanism for moving said support about said axis comprising a worm gear and a worm engaging said worm gear, and means for automatically compensating for wear in said mechanism, substantially as described.

2. In a device of the class described, a camera support mounted for movement about a given axis, mechanism for moving said support about said axis comprising a worm gear and a worm engaging said worm gear, and unitary means for compensating for wear in said mechanism and for taking up the end thrust of said worm, substantially as described.

3. In a device of the class described, a support mounted for movement about a given axis, mechanism for moving said support about said axis comprising a gear fast to said support and an operating gear engaging said first gear, and unitary means for compensating for wear in said mechanism and for taking up the end thrust of said operating gear, substantially as described.

4. In a device of the class described, a camera support mounted for movement about a pair of angularly disposed axes, separate mechanisms for moving said support about said axes respectively, each of said mechanisms comprising a worm gear and a worm engaging said worm gear, and separate means for automatically compensating for wear in each of said mechanisms, substantially as described.

5. In a device of the class described, a camera support mounted for movement about a pair of angularly disposed axes, separate mechanisms for moving said support about said axes respectively, each of said mechanisms comprising a worm gear and a worm engaging said worm gear, and separate unitary means for compensating for wear in each of said mechanisms respectively and for taking up the end thrust of the worms thereof, substantially as described.

6. In a device of the class described, an oscillatory support for a camera, means for oscillating said support comprising a worm gear secured to said support and a worm engaging said worm gear, a bearing in which said worm is journaled, said bearing being pivotally mounted to provide for movement of the worm toward and from the axis of said worm gear, and mechanism comprising resilient means constantly tending to move said worm about the pivot of said bearing toward the axis of said worm gear, substantially as described.

7. In a device of the class described, a pivotally mounted camera support, means for effecting pivotal movement thereof comprising a pair of engaging gears, and unitary means for compensating for wear in said gears and for taking up the end thrust of one of said gears, substantially as described.

8. In a device of the class described, a pivotally mounted camera support, means for effecting pivotal movement thereof comprising a worm gear and a worm engaging said worm gear, and means for yieldingly holding said worm and worm gear in engagement, substantially as described.

9. In a device of the class described, a pivotally mounted camera support, means for effecting pivotal movement thereof comprising a worm gear and a worm engaging said worm gear, and unitary means for yieldingly holding said worm and worm gear in engagement and for taking up the end thrust of said worm, substantially as described.

10. In a device of the class described, operating mechanism comprising a pair of engaging gears, and unitary means for compensating for wear in said mechanism and for taking up the end thrust of one of said gears, substantially as described.

11. In a device of the class described, operating mechanism comprising a worm gear and a worm engaging said worm gear, and means for yieldingly holding said worm in engagement with said worm gear, substantially as described.

12. In a device of the class described, operating mechanism comprising a worm gear and a worm engaging said worm gear, and unitary means for compensating for wear in said mechanism and for taking up the end thrust of said worm, substantially as described.

13. In a device of the class described, a worm gear, a worm engaging said worm gear, and unitary means for compensating for wear in said worm and worm gear and for taking up the end thrust of said worm, comprising a member connected with said worm and having a cam surface and a spring pressed member having a cam surface adapted to coact with the cam surface of the member connected with the worm, substantially as described.

14. In a device of the class described, a pivotally mounted camera support, means for moving said support about its pivot comprising a worm gear and a worm engaging said gear and mounted for movement toward and from the same, and resilient means constantly tending to move said worm toward said worm gear, substantially as described.

15. In a device of the class described, a pivotally mounted camera support, means for moving said support about its pivot comprising a worm gear and a pivoted worm engaging said gear and movable about its pivot toward and from the same, and resilient means constantly tending to move said worm about its pivot toward said worm gear, substantially as described.

16. In a device of the class described, a pivotally mounted camera support, means for moving said support about its pivot comprising a worm gear and a worm engaging said gear and mounted for movement toward and away from the same, and unitary mechanism comprising resilient means constantly tending to move said worm toward said gear and adapted to take up the end thrust of said worm, substantially as described.

17. In a device of the class described, a pivotally mounted camera support, means for moving said support about its pivot comprising a worm gear and a pivoted worm engaging said gear and movable about its pivot toward and from the same, and unitary mechanism comprising resilient means constantly tending to move said worm about its pivot toward said worm gear and adapted to take up the end thrust of said worm, substantially as described.

18. In a device of the class described, a pivotally mounted camera support, and means for moving said support about its pivot, comprising a worm gear and a worm engaging said worm gear and mounted for movement toward and from the axis thereof, said worm being biased toward the axis of said worm gear, substantially as described.

19. In a device of the class described, a horizontal frame having a vertical hollow hub, a camera support having a depending bearing member extending through and journaled in said hub, a ball race on the upper surface of said frame, anti-friction balls in said ball race, and resilient means coacting with said hub and said bearing member to yieldingly hold said support in a position with its lower surface adjacent the upper surface of said frame and in engagement with said balls, substantially as described.

20. In a device of the class described, a frame, a camera support yieldingly connected with said frame for pivotal movement with respect thereto, and means comprising a pair of engaging gears, one mounted on said frame and the other mounted on said support, for effecting such pivotal movement of said support, said gears being entirely inclosed by said frame and support, substantially as described.

21. In a device of the class described, a horizontal frame, a horizontal support yieldingly and adjustably connected with said frame for pivotal movement about a vertical axis, anti-friction bearing means disposed between said frame and support, means for effecting such pivotal movement of said support comprising a gear fixed to said frame and a gear rotatably mounted on said support and engaging said fixed gear, said gears being inclosed by said frame and support, a frame detachably secured to said support and having a camera supporting member mounted thereon for pivotal movement about a horizontal axis, and means for effecting such pivotal movement of the camera supporting member comprising a gear fixed thereto and another gear engaging the latter and rotatably mounted in the frame secured to said support, substantially as described.

22. In a device of the class described, a horizontal frame having a vertical hollow hub, a member mounted on said frame and having a depending hollow bearing extending through and journaled in said hub, a flanged nut threaded to the lower end of said bearing, resilient means coacting with said flanged nut and said hub for yieldingly holding said member in a position adjacent said frame, a camera supporting device, and means for detachably connecting said device and member comprising a rod extending through and rotatable in said hollow bearing, said rod having a screw threaded connection with said device, substantially as described.

23. In a device of the class described, a pivotally mounted camera support, mechanism for effecting pivotal movement thereof comprising a pair of engaging gears and means for automatically compensating for wear in said mechanism, substantially as described.

This specification signed and witnessed this 19th day of May, 1915.

JOHN H. THEISS.

Witnesses:
WILLIAM A. HARDY,
J. UNGER.